(12) United States Patent
Lee et al.

(10) Patent No.: US 8,099,050 B1
(45) Date of Patent: *Jan. 17, 2012

(54) DIGITAL RADIO DATA SYSTEM RECEIVER METHODS AND APPARATUS

(75) Inventors: Jungwon Lee, Cupertino, CA (US); Dimitrios-Alexandros Toumpakaris, Sunnyvale, CA (US); Hui-Ling Lou, Palo Alto, CA (US); Chris Cheng-Chieh Lee, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/544,567

(22) Filed: Aug. 20, 2009

Related U.S. Application Data

(63) Continuation of application No. 11/488,437, filed on Jul. 17, 2006, now Pat. No. 7,587,170.

(60) Provisional application No. 60/726,636, filed on Oct. 14, 2005.

(51) Int. Cl.
*H04B 1/16* (2006.01)

(52) U.S. Cl. .......... 455/45; 455/214; 455/293; 455/337

(58) Field of Classification Search .................. 455/42, 455/45, 205–209, 214, 260, 337, 293; 375/324–327, 375/343
See application file for complete search history.

(56) References Cited

U.S. PATENT DOCUMENTS

| | | | |
|---|---|---|---|
| 6,856,646 B2 * | 2/2005 | Carbone et al. | 375/143 |
| 7,587,170 B1 * | 9/2009 | Lee et al. | 455/45 |
| 2002/0126771 A1 | 9/2002 | Li et al. | |
| 2003/0184368 A1 | 10/2003 | Li et al. | |
| 2007/0032217 A1 | 2/2007 | Su | |

OTHER PUBLICATIONS

Lin, Jui-Yuan et al., "Digital RDS Demodulation in FM Subcarrier Systems," The 2004 IEEE Asia-Pacific Conference on Circuits and Systems, Dec. 6-9, 2004.

National Radio Systems Committee, United States RBDS Standard, Apr. 9, 1998.

Sala, Michele et al., "Design Considerations and Implementation of a DSP-Based Car-Radio IF Processor", IEEE Journal of Solid-State Circuits, vol. 39, No. 7, pp. 1110-1118, Jul. 2004.

* cited by examiner

*Primary Examiner* — Nguyen Vo

(57) ABSTRACT

Methods and apparatus are provided for receiving a first signal and generating an output signal indicative of radio data system ("RDS") information. A receiver circuit of the invention can include mixer circuitry, lowpass filter circuitry, downsampler circuitry, and decoder circuitry. Advantageously, the receiver circuit can operate entirely within the digital domain, promoting interoperability with digital frequency modulation ("FM") demodulator circuitry.

20 Claims, 8 Drawing Sheets

DIGITAL RADIO DATA SYSTEM RECEIVER METHODS AND APPARATUS

This application is a continuation of U.S. patent application Ser. No. 11/488,437, filed Jul. 17, 2006, which claims the benefit of U.S. Provisional Application No. 60/726,636, filed Oct. 14, 2005, each of which is hereby incorporated by reference herein in its entirety.

BACKGROUND OF THE INVENTION

This invention relates to receiver circuitry. More particularly, this invention relates to circuitry for receiving radio data system ("RDS") signals.

Radio signals often include several components multiplexed together upon transmission. For example, it is relatively common for a radio signal to include both an audio signal (either stereo or monophonic) and a RDS signal, where the RDS signal contains information such as the station name, program type, music information, artist information, and traffic information. These multiplexed radio signals are often transmitted from a base station to individual users via frequency modulation ("FM"), where information is conveyed through variations of the frequency of the transmitted signal, or via amplitude modulation ("AM"), where information is conveyed through variations of the amplitude of the transmitted signal. Although the discussion herein focuses on FM signals for the purpose of clarity, it will be understood that its principles can also be applied to AM signals or any other appropriate type of signal without deviating from the spirit or scope of the invention.

When a FM signal is received, it is typically demodulated by a FM demodulator circuit and passed to both audio circuitry and RDS receiver circuitry. The audio circuitry can extract the audio portion of the signal (e.g., music or speech) and prepare it for playback through a speaker or other output device. The RDS receiver circuitry can extract the RDS portion of the signal and prepare it for processing by appropriate data processing circuitry. As an example, the data processing circuitry can display part or all of the extracted data to the user as text on a suitable user interface.

Traditionally, FM demodulator circuitry would operate in the analog domain and transmit an analog output signal to both the audio circuitry and the RDS receiver circuitry. The RDS receiver circuitry would then extract the RDS data and output it as either an analog signal or a digital signal. (If the RDS data is output as a digital signal, the RDS receiver circuitry may need to perform an analog-to-digital conversion.) However, recently it has become more common for FM demodulation circuitry to operate at least partly in the digital domain, and output a digital signal to the audio circuitry and RDS receiver circuitry. In such a scenario, it can be relatively undesirable to convert the data back into the analog domain (e.g., through the use of a digital-to-analog converter) in preparation for processing by the RDS receiver circuitry. The necessary converter would introduce unnecessary delay, consume additional area, and increase design and implementation complexity.

In view of the foregoing, it would be desirable to provide methods and apparatus that allowed RDS receiver processing in the digital domain. It would further be desirable to have digital RDS receiver circuitry that was relatively simple and consumed relatively little area.

SUMMARY OF THE INVENTION

In accordance with this invention, methods and apparatus are provided for receiving RDS data signals entirely in the digital domain. In an embodiment of the invention, a circuit can be operable to receive a first signal. The circuit can include mixer circuitry operable to accept the first signal as an input, filter circuitry in communication with the mixer circuitry, downsampler circuitry in communication with the filter circuitry, and decoder circuitry in communication with the downsampler circuitry. An output signal of the decoder circuitry can be indicative of RDS information.

In another embodiment of the invention, a first signal can be received. A frequency range of the first signal can be shifted to a second frequency range lower than the first frequency range to generate a second signal. Content of a signal responsive to the second signal can be extracted to generate a third signal. A signal responsive to the third signal can be downsampled by a first rate to generate a fourth signal. A signal responsive to the fourth signal can be decoded to generate an output signal. The output signal can be indicative of RDS information.

In yet another embodiment of the invention, a circuit can be operable to receive a first signal. The circuit can include mixer means for shifting a frequency range of the first signal to a second frequency range lower than the first frequency range, to generate a second signal. The circuit can also include filter means for extracting content of a signal responsive to the second signal, to generate a third signal. In addition, the circuit can include downsampler means for downsampling a signal responsive to the third signal by a first rate, to generate a fourth signal. The circuit can also include decoder means for decoding a signal responsive to the fourth signal to generate an output signal, where the output signal can be indicative of RDS information.

The filter means for extracting the content of the signal responsive to the second signal can include lowpass filter means for extracting low-frequency content of the signal responsive to the second signal. The circuit of the invention can further include demodulator means for demodulating a FM radio signal to generate a fifth signal, where the first signal is responsive to the fifth signal. Matched filter means for filtering a signal responsive to the third signal with a first filtering function can also be included in the circuit. The first filtering function can be matched to a second filtering function of transmitter circuitry, and the transmitter circuitry can be operable to transmit the FM radio signal.

In addition, the circuit can further include second downsampler means for downsampling a frequency range of a signal responsive to the second signal by a second rate to generate a fifth signal. A mathematical product of the first and second rates can be substantially equal to a modulation rate of transmitter circuitry, where the transmitter circuitry can be operable to transmit a modulated version of the first signal.

Carrier recovery means can be included in the circuit for recovering a carrier signal from a signal responsive to the fourth signal. The carrier recovery means can include phase detector means for detecting a phase of the carrier signal to generate a phase-difference signal. The carrier recovery means can further include loop filter means for filtering the phase-difference signal to generate a control signal. Furthermore, the carrier recovery means can include oscillator means for generating an oscillating signal whose phase and frequency are determined by the control signal. Demodulator means can be included in the carrier recovery means for using the oscillating signal to demodulate the signal responsive to the fourth signal. The decoder means of the circuit can include means for decoding the signal responsive to the fourth signal using a coherent decoding scheme.

The circuit of the invention can further include symbol timing acquisition means for acquiring a first symbol timing rate of the signal responsive to the third signal. The circuit can also include symbol timing tracking means for tracking a second symbol timing rate of the signal responsive to the third signal. The symbol timing acquisition means and the symbol timing tracking means can be in communication with the first downsampler means. The symbol timing tracking means can include phase detector means for detecting a phase of the signal responsive to the third signal to generate a phase-difference signal. The symbol timing tracking means can further include loop filter means for filtering the phase-difference signal to generate a control signal. Furthermore, the symbol timing tracking means can include oscillator means for generating an oscillating signal whose phase and frequency are determined by the control signal. The first downsampler means can be operable to accept the oscillating signal as an input.

The decoder means of the circuit can use a coherent decoding scheme or a differential decoding scheme. The first signal, which can be received by the mixer means, can be a digital signal. The circuit of the invention can also include analog-to-digital converter means for converting an analog signal into the first digital signal. Finally, the circuit of invention can be included in a media player.

The invention therefore advantageously provides methods and apparatus for RDS receiver processing in the digital domain. Digital RDS receiver circuitry of the invention can advantageously be relatively simple and consume relatively little area.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
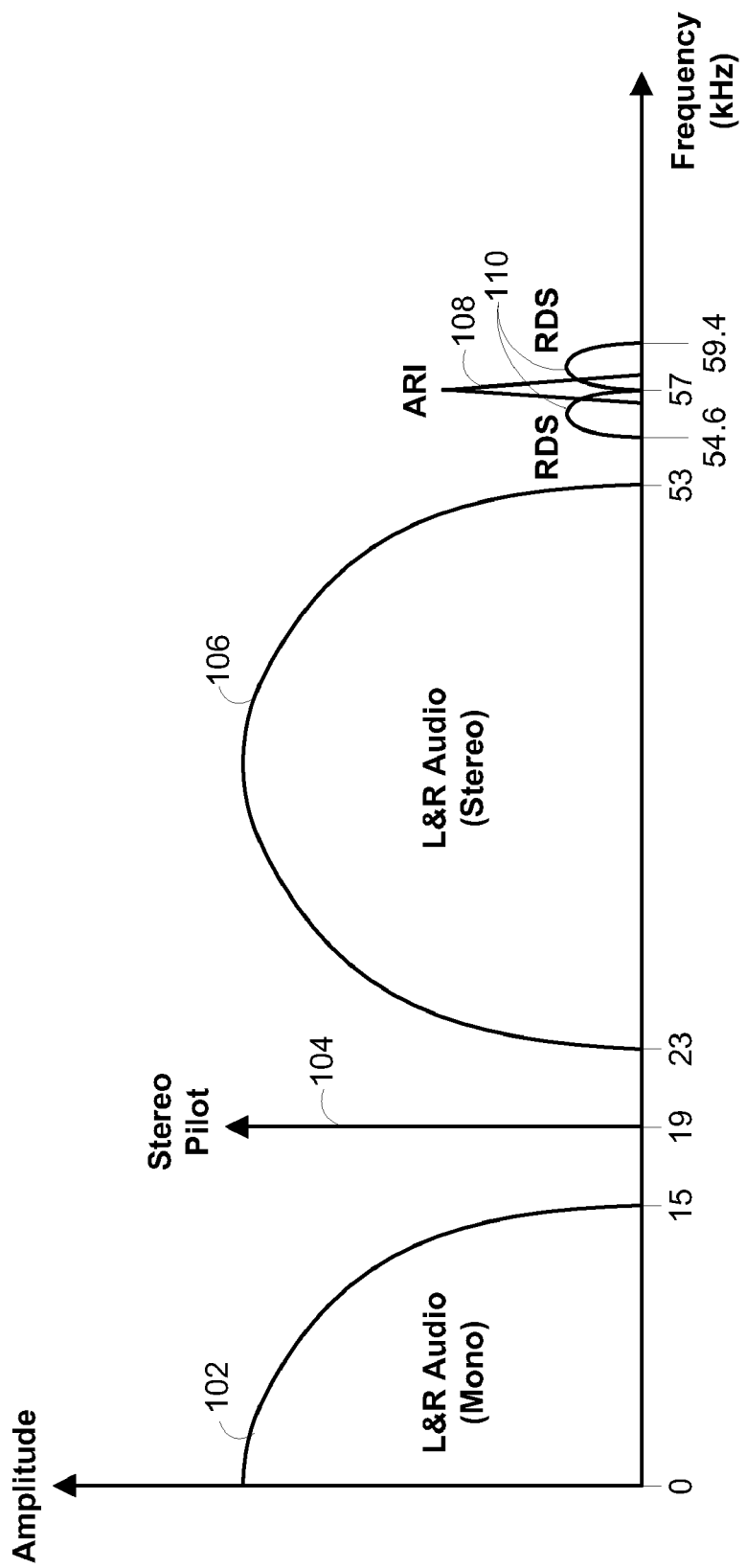
FIG. 1 is a signal diagram showing illustrative radio signal characteristics in the frequency domain.

FIG. 1 is a signal diagram showing illustrative radio signal characteristics in the frequency domain. The horizontal axis represents frequency, measured in kilohertz ("kHz"), while the vertical axis represents signal amplitude at a particular frequency. As shown, signal 102 can range from approximately 0 kHz to approximately 15 kHz, and can carry monophonic audio information for both the left and right audio channels. Signal 104 is the stereo pilot, which can represent the carrier wave on which the radio data is transmitted. In this example, the stereo pilot has a frequency of approximately 19 kHz. Signal 106 can range from approximately 23 kHz to approximately 53 kHz, and can carry stereo audio information for both the left and right audio channels. In most cases, only one of monophonic signal 102 and stereo signal 106 will be transmitted by a given radio transmitter circuit.

As shown, RDS signal 110 can range from approximately 54.6 kHz to approximately 59.4 kHz. RDS signal 110 can be multiplexed with either monophonic audio signal 102 or stereo audio signal 106 by radio transmitter circuitry. RDS signal 110 can contain information associated with the corresponding audio signal, including but not limited to station name, program type, music information, artist information, traffic information, or any combination thereof.

Autofahrer Rundfunk Information ("ARI") signal 108 can also be multiplexed with the audio signal and RDS signal 110 by appropriate transmitter circuitry. In the example shown, ARI signal 108 falls substantially within the frequency range of RDS signal 110, but utilizes a carrier at approximately 57 kHz that is approximately ninety degrees out of phase with the carrier of RDS signal 110. The entire radio signal, including the audio signal, RDS signal 110, and optionally ARI signal 108, can be FM-modulated by transmitter circuitry and transmitted to a receiver.

Figure 2:
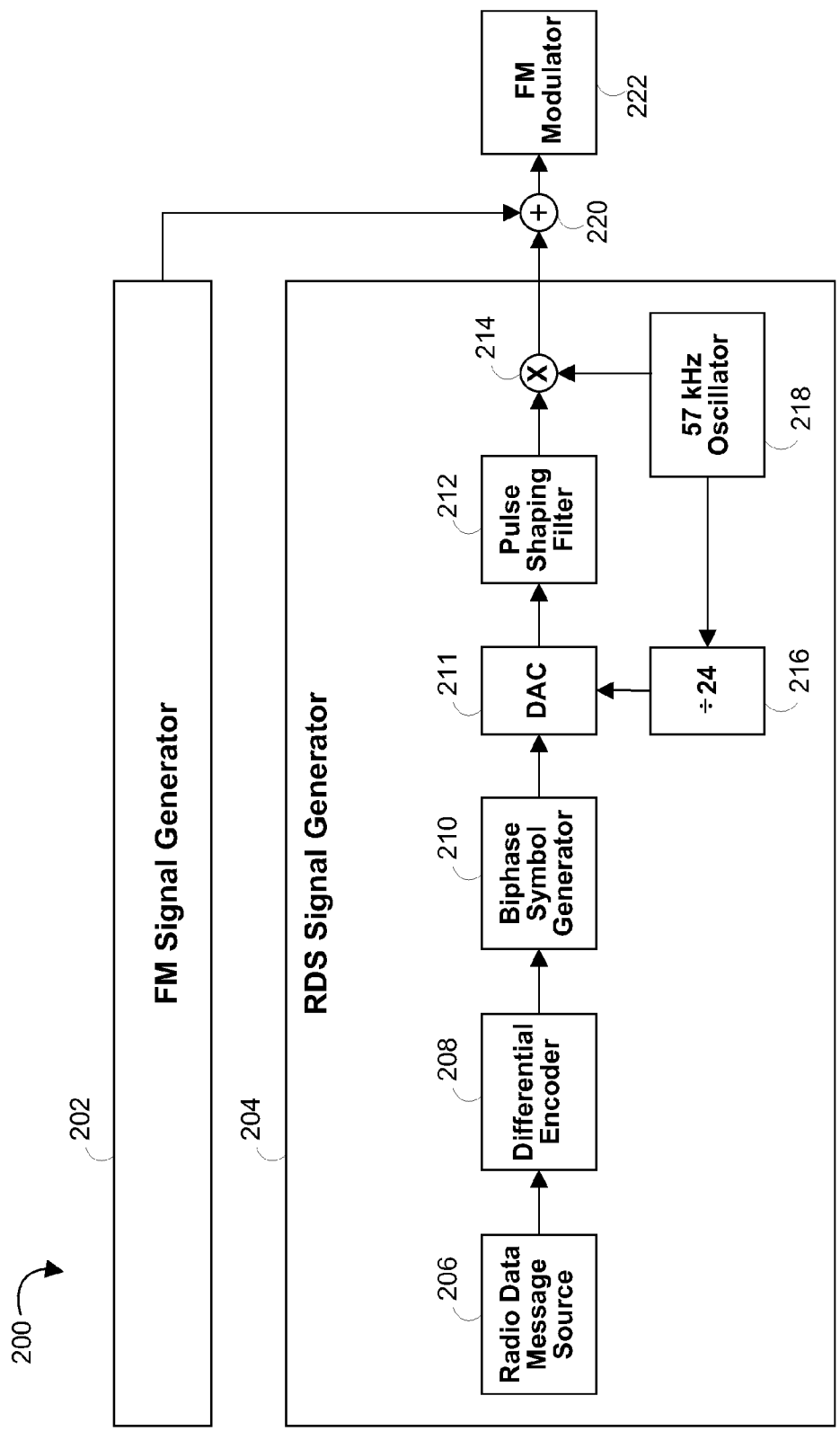
FIG. 2 is a block diagram showing an illustrative radio transmitter architecture.

FIG. 2 is a block diagram showing illustrative radio transmitter architecture 200. Radio transmitter architecture 200 can include FM signal generator 202, RDS signal generator 204, multiplexer circuitry 220, and FM modulator circuitry 220. FM signal generator 202 can generate an audio data signal (e.g., monophonic audio signal 102 or stereo audio signal 106 in FIG. 1), which can include content such as music, news, advertisements, or any combination thereof. RDS signal generator 204 can generate RDS information such as station name, program type, music information, artist information, traffic information, or any combination thereof.

RDS signal generator 204 can include radio data message source 206, differential encoder circuitry 208, biphase symbol generator 210, digital-to-analog converter ("DAC") circuitry 211, pulse shaping filter circuitry 212, modulator circuitry 214, divider circuitry 216, and oscillator circuitry 218. Radio data message source 206 can generate the RDS information that is ultimately transmitted, for example, a conventional binary data representation of the station name.

Differential encoder circuitry 208 can encode this information appropriately. For instance, if differential encoder 208 uses a differential encoding scheme, a logical "1" can be represented by a phase change of approximately 180 degrees between successive bits, while a logical "0" can be represented by a phase change of approximately 0 degrees. As another example, if differential encoder 208 uses a coherent encoding scheme, a logical "1" can be represented by an absolute phase of approximately 0 degrees for the corresponding bit, while a logical "0" can be represented by an absolute phase of approximately 180 degrees.

The output signal of differential encoder circuitry 208 can be shaped by biphase symbol generator 210 before being converted into the analog signal domain by DAC 211. DAC 211 can be clocked by the output signal of divider circuitry 216, which in turn can be operable to receive the output signal of oscillator circuitry 218. Divider circuitry 216 can scale down the frequency of its input signal by a certain ratio. For example, if oscillator circuitry 218 generates a clock signal of approximately 57 kHz and divider circuitry 26 operates with a divider ratio of approximately 24, DAC 211 can generate analog output symbols at a frequency of approximately 57/24, or 2.375, kHz. The output signal of DAC 211 can be smoothed by pulse shaping filter 212, then modulated by modulator circuitry 214 using a frequency determined by oscillator circuitry 218. Pulse shaping filter 212 can be, for example, a square-root raised cosine pulse shaping filter.

The RDS output of RDS signal generator 204 can be multiplexed with the audio output of FM signal generator 202 onto a single channel by multiplexer circuitry 220. The output of multiplexer circuitry 220 can then be modulated to an appropriate station frequency by FM modulator circuitry 220 for transmission to an appropriate receiver circuit.

Figure 3:
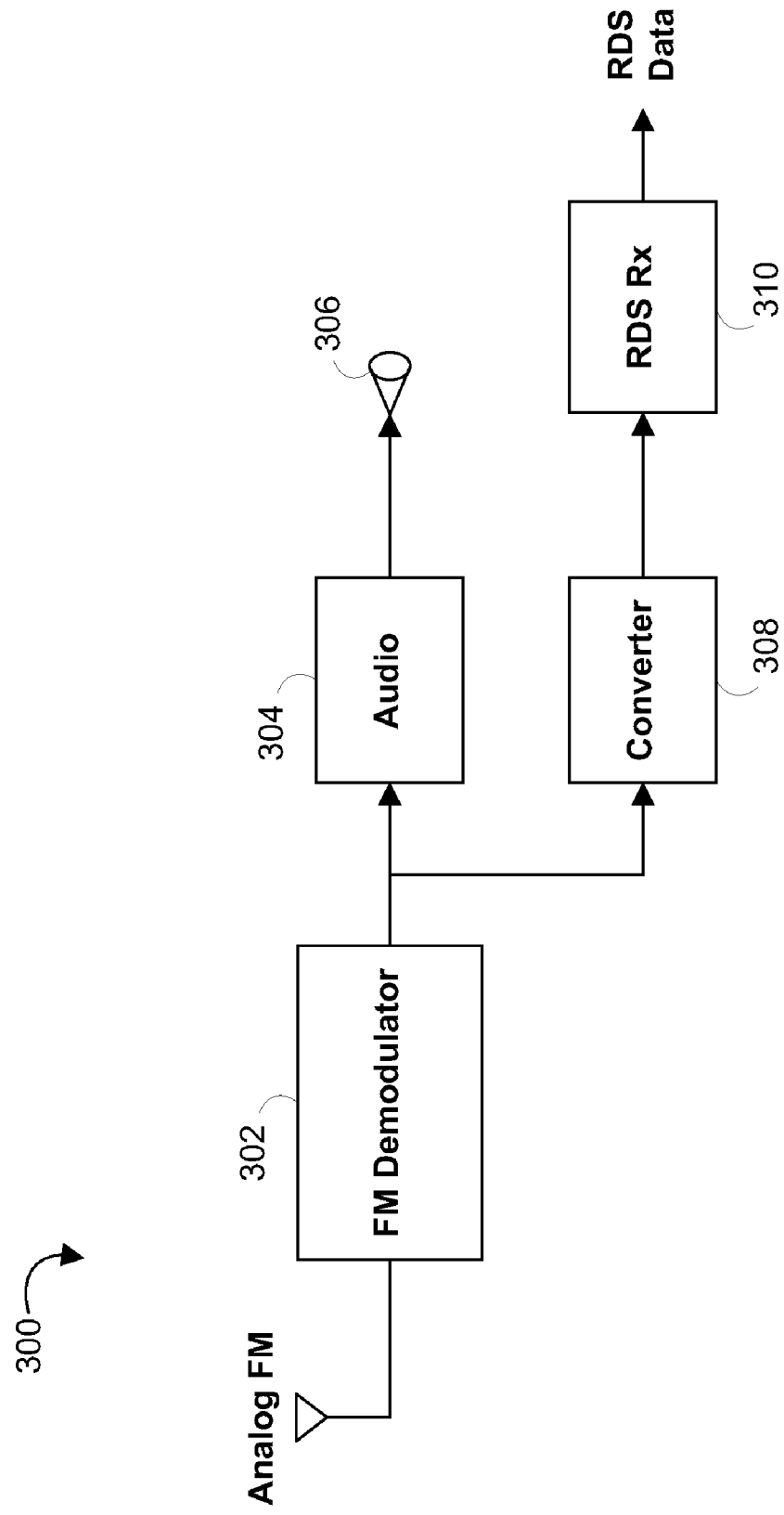
FIG. 3 is a block diagram showing an illustrative radio receiver architecture.

FIG. 3 is a block diagram showing illustrative radio receiver architecture 300. A transmitted analog FM signal can be received by FM demodulator circuitry 302, which can demodulate the received signal by a frequency determined by the station or frequency that is being tuned to. FM demodulator circuitry 302 can be analog, digital, or a combination of the two. For instance, FM demodulator circuitry 302 can include analog input components coupled to digital output components via analog-to-digital converter ("ADC") circuitry. It will be understood that, as used herein, the expression "coupled to" can be used to define either a direct or an indirect connection between elements.

The output signal of FM demodulator circuitry 302 can be received by audio circuitry 304, which can extract and decode the audio component of the received signal and send it to speaker circuitry 306. The output signal of FM demodulator circuitry 302 can also be received by RDS receiver circuit 310 after being processed by converter 308. RDS receiver circuit 310 can extract and decode the RDS component of the received signal and send it to any appropriate output circuitry. For instance, the extracted RDS data may be displayed to a user via any suitable display circuitry, to convey information about the audio data being played.

It will be noted that converter circuitry 308 may not be necessary in some cases. For instance, traditional FM demodulator circuitry and RDS receiver circuits are often analog, in which case converter circuitry 310 can be omitted. However, if FM demodulator circuitry generates a digital output signal and RDS receiver circuit 310 operates in the analog domain, converter 308 might be needed to convert the digital signal to an analog signal before processing by RDS circuit 310.

In accordance the present invention, both FM demodulator circuitry 302 and RDS receiver circuit 310 may be digital, such that converter circuitry 308 may be unnecessary. The omission of converter circuitry 308 can advantageously save circuit area, reduce design and implementation complexity, and improve speed. It will be noted that, even if RDS receiver circuit 310 is digital and FM demodulator 302 is analog, they may still be used together if coupled through appropriate converter circuitry 308.

Figure 4:
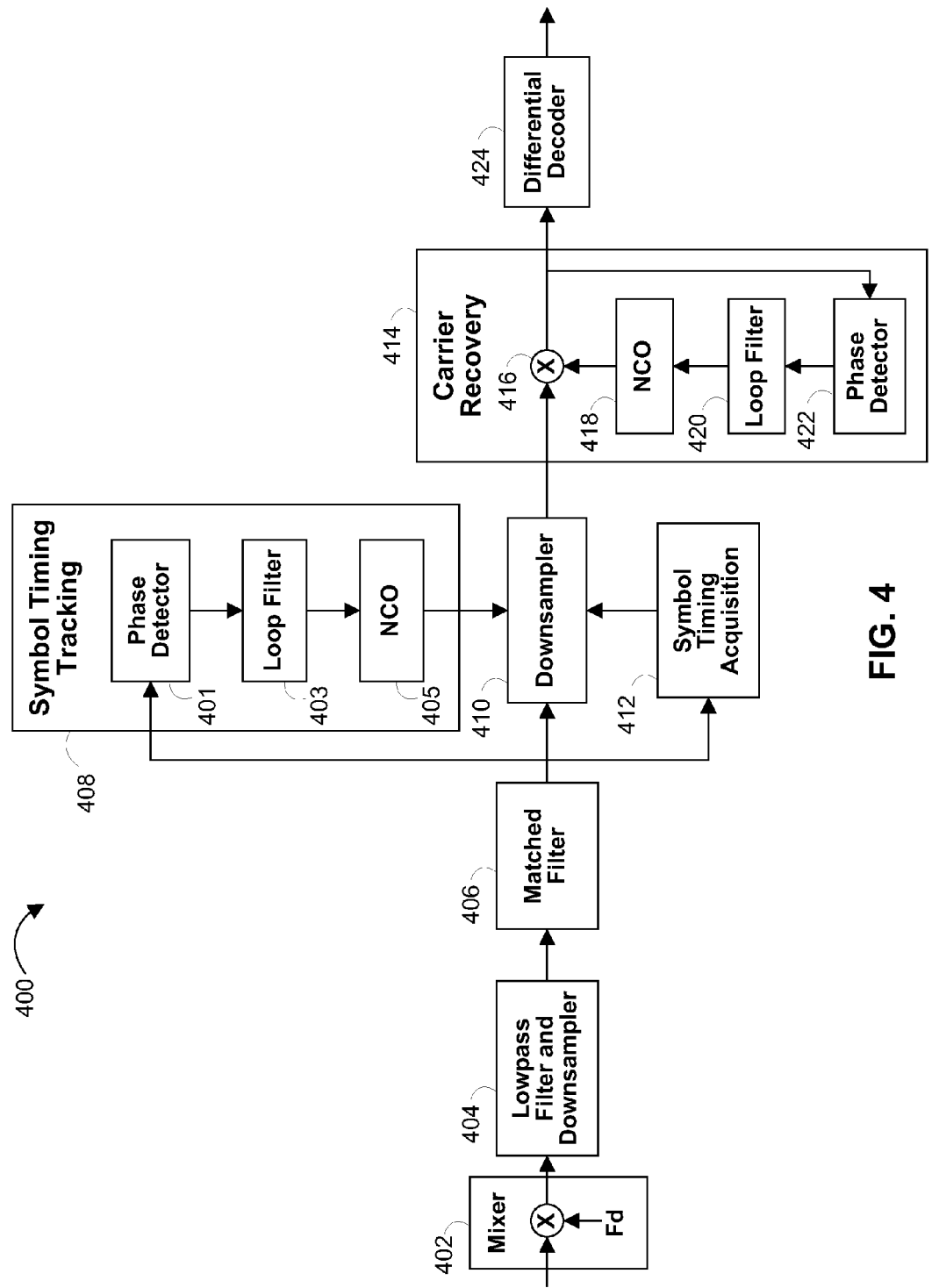
FIG. 4 is a block diagram showing an illustrative RDS receiver circuit in accordance with the invention.

FIG. 4 is a block diagram showing illustrative RDS receiver circuit 400 in accordance with the invention. Receiver circuit 400 can be used as RDS receiver circuit 310 in radio receiver architecture 300. Receiver circuit 400 can include mixer circuitry 402, lowpass filter and downsampler circuitry 404, matched filter circuitry 406, symbol timing tracking circuitry 408, downsampler circuitry 410, symbol timing acquisition circuitry 412, carrier recovery circuitry 414, and differential decoder circuitry 424. As will be discussed in greater detail below, carrier recovery circuitry 414 can be optional in certain embodiments of the invention.

Mixer circuitry 402 can be operable to receive an FM-demodulated signal containing a multiplexed combination of audio data and RDS data. Mixer circuitry 402 can also be operable to receive a clock signal of frequency Fd, which determines the frequency by which the incoming FM-demodulated signal is shifted. Preferably, mixer circuitry 402 can be operable to shift a frequency range of incoming multiplexed signal down to a lower frequency range. For example, a frequency of the multiplexed signal can be shifted such that the RDS component is centered around a direct current ("DC") frequency, or approximately 0 kHz. Referring back to FIG. 1, the component signals can all be shifted down by approximately 57 kHz, such that RDS signal 110 can be centered around approximately 0 kHz.

Lowpass filter and downsampler circuitry 404 can extract low-frequency content of the output signal of mixer circuitry 402, such that only RDS signal 110 remains, and all other components of the frequency-shifted signal are substantially removed. It will be noted that, if an ARI signal is included in the frequency-shifted multiplexed signal, the ARI signal would also remain after the filtering operation. Lowpass filter and downsampler 404 can also downsample the output signal of mixer circuitry 404 to a lower frequency. Preferably, the downsampling can at least partially undo the modulation of modulator circuitry 214 in RDS signal generator 204. As will be discussed later, in an embodiment of the invention, the remainder of the downsampling needed to reverse the modulation of modulator circuitry 214 can be performed by downsampler circuitry 410.

Matched filter circuitry 406 can be operable to receive the output signal of lowpass filter and downsampler circuitry 404. In an embodiment of the invention, matched filter circuitry 406 can preferably undo the shaping effects of both biphase signal generator 210 and pulse shaping filter circuitry 212 of RDS signal generator 204. In another embodiment of the invention, matched filter 406 can undo the shaping effects of only biphase signal generator 210, while a second matched filter can undo the effects of pulse shaping filter circuitry 212. This second matched filter can be placed just before differential decoder circuitry 424. Such an embodiment is illustrated in greater detail in FIG. 5.

It will be noted that matched filter circuitry 406 can substantially remove any ARI signal content that may be present in the output signal of lowpass filter and downsampler circuitry 404. Improved ARI signal removal can preferably be achieved by using high pass filter circuitry in conjunction with matched filter circuitry 406.

Downsampler circuitry 410 can be operable to receive the output signal of matched filter circuitry 406 and downsample the signal to a lower frequency. Preferably, the downsampling can at least partially undo the modulation of modulator circuitry 214 in RDS signal generator 204. In an embodiment of the invention, lowpass filter and downsampler circuitry 404 and downsampler circuitry 410 can together substantially undo the effects of modulator circuitry 214. In other words, if modulator circuitry 214 can multiply the frequency of its incoming data signal by a factor of F, and lowpass filter and downsampler circuitry 404 can divide the frequency of its incoming data signal by a factor of F1, downsampler circuitry 410 can preferably divide the frequency of its input signal by a factor of F2=F/F1.

Preferably, downsampler circuitry 410 can demodulate its input signal by a non-integer factor F2. Such capability can be desirable, for instance, if the sampling rate of FM demodulator circuitry 302 is not an integer multiple of the RDS symbol rate. Such a situation may arise, for instance, if converter circuitry 308 applies a non-integer sampling rate (e.g., 44.1 kHz in the case of some audio applications) to its input signal. Other demands of the application or architecture in which RDS receiver circuit 400 is used can likewise necessitate the use of a non-integer demodulation rate.

One known method of performing demodulation is to perform carrier recovery on a received signal, then use error information from the recovery to determine an appropriate symbol timing rate. However, such an approach can be relatively complex when the downsampling rate is non-integral. Moreover, carrier recovery circuitry 414 is preferably optional in an embodiment of the invention. Therefore, it can be more desirable to directly acquire and track the symbol timing rate of the incoming RDS signal. In an embodiment of the invention, symbol timing acquisition circuitry 412 and symbol timing tracking circuitry 408 can be used to facilitate the non-integer downsampling of downsampler circuitry 410.

Symbol timing acquisition circuitry 412 can examine its input signal (which can have characteristics of a square wave, a sinusoidal wave, or both) and identify local maximum and local minimum points in the input signal. Each such point preferably has an amplitude that is greater than or substantially equal to adjacent points. Preferably, the frequency with which these local maximum and local minimum points are detected can be substantially identical to the symbol rate of the input signal.

Once the frequency and phase of the input signal are determined by symbol timing acquisition circuitry 412, symbol timing tracking circuitry 408 can facilitate accurate maintenance of the acquired symbol timing. Symbol timing tracking circuitry 408 can include phase detector circuitry 401, loop filter circuitry 403, and numerically controlled oscillator ("NCO") circuitry 405, coupled to each other in a chain as shown in FIG. 4. It will be noted that, in accordance with the invention, any suitable approach can be used to achieve symbol timing tracking. For instance, one such approach (which can be applied if the carrier wave is substantially symmetrical) is to compare the amplitude of adjacent local maximum and local minimum points. If the amplitudes of these adjacent points are substantially equal to each other, then it may be determined that symbol timing acquisition has been substantially successful. On the other hand, if the amplitudes of adjacent points are substantially different from each other, then it may be determined that symbol timing acquisition has not yet completed successfully.

Even after symbol timing acquisition and tracking have been performed, and the received signal has been appropriately downsampled, it is still possible that errors, preferably relatively minor, will remain in the output signal of downsampler circuitry 410. Carrier recovery circuitry 414 can be used to correct these errors. Carrier recovery circuitry 414 can include demodulation circuitry 416, NCO circuitry 418, loop filter circuitry 420, and phase detector circuitry 422, coupled to each other in a loop as shown in FIG. 4. Carrier recovery circuitry 414 can adjust the phase and frequency of the output clock signal of NCO circuitry 418, which can be used by demodulator circuitry 406 to accurately downsample the output signal of downsampler circuitry 416. The output signal of carrier recovery circuitry 414 can then be transmitted to differential decoder circuitry 424. In an embodiment of the invention, carrier recovery circuitry 414 can be optional, especially if differential decoder circuitry 424 uses a differential decoding scheme (as opposed to a coherent decoding scheme). Differential decoder circuitry 424 can accept the output signal of carrier recovery circuitry 414 and decode it to generate a binary data signal, which can represent the RDS information originally transmitted. Further details of the operation and structure of differential decoder circuitry 424 will be explained below, in connection with FIGS. 6 and 7.

Figure 5:
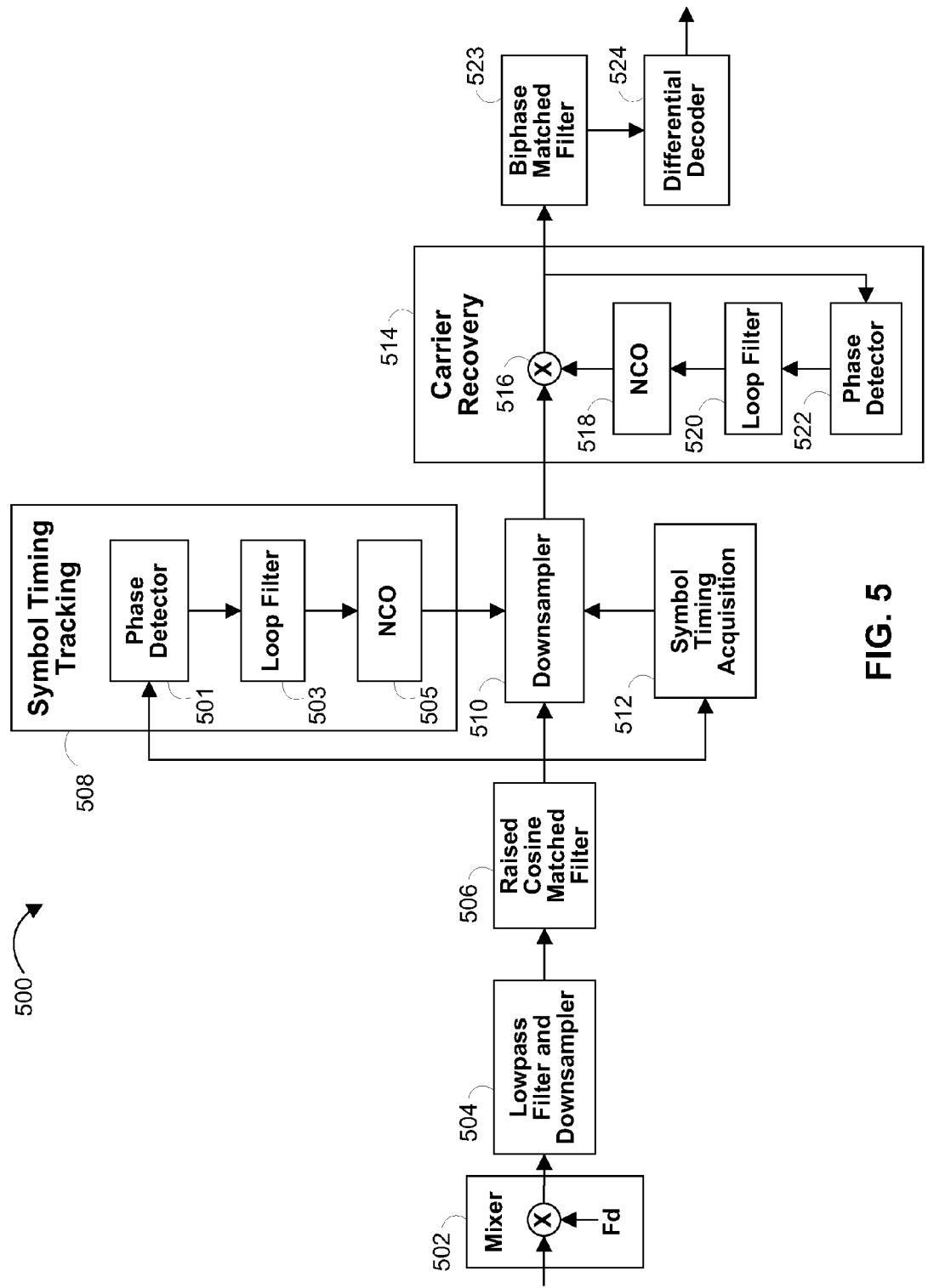
FIG. 5 is a block diagram showing an alternative illustrative RDS receiver circuit in accordance with the invention.

FIG. 5 is a block diagram showing an alternative illustrative RDS receiver circuit 500 in accordance with the invention. RDS receiver circuit 500 is similar in design and functionality to receiver circuit 400, and reference characters of like elements differ by 100 between FIGS. 4 and 5. Accordingly, it is not deemed necessary to describe the component elements of RDS receiver circuit 500 in great detail. The key difference between the two embodiments is that the functionality of matched filter circuitry 406 of RDS receiver circuit 400 is broken up into raised cosine matched filter 506 and biphase matched filter circuitry 523 in RDS receiver circuit 500. As shown, raised cosine matched filter circuitry 506 can be placed immediately before downsampler circuitry 510 (occupying the same position as matched filter circuitry 406), while biphase matched filter circuitry 523 can be placed immediately before differential decoder circuitry 524. It will be noted that RDS receiver circuit 500 can be implemented without carrier recovery circuitry 514, especially if differential decoder circuitry 524 performs differential decoding (as opposed to coherent decoding).

Figure 6:
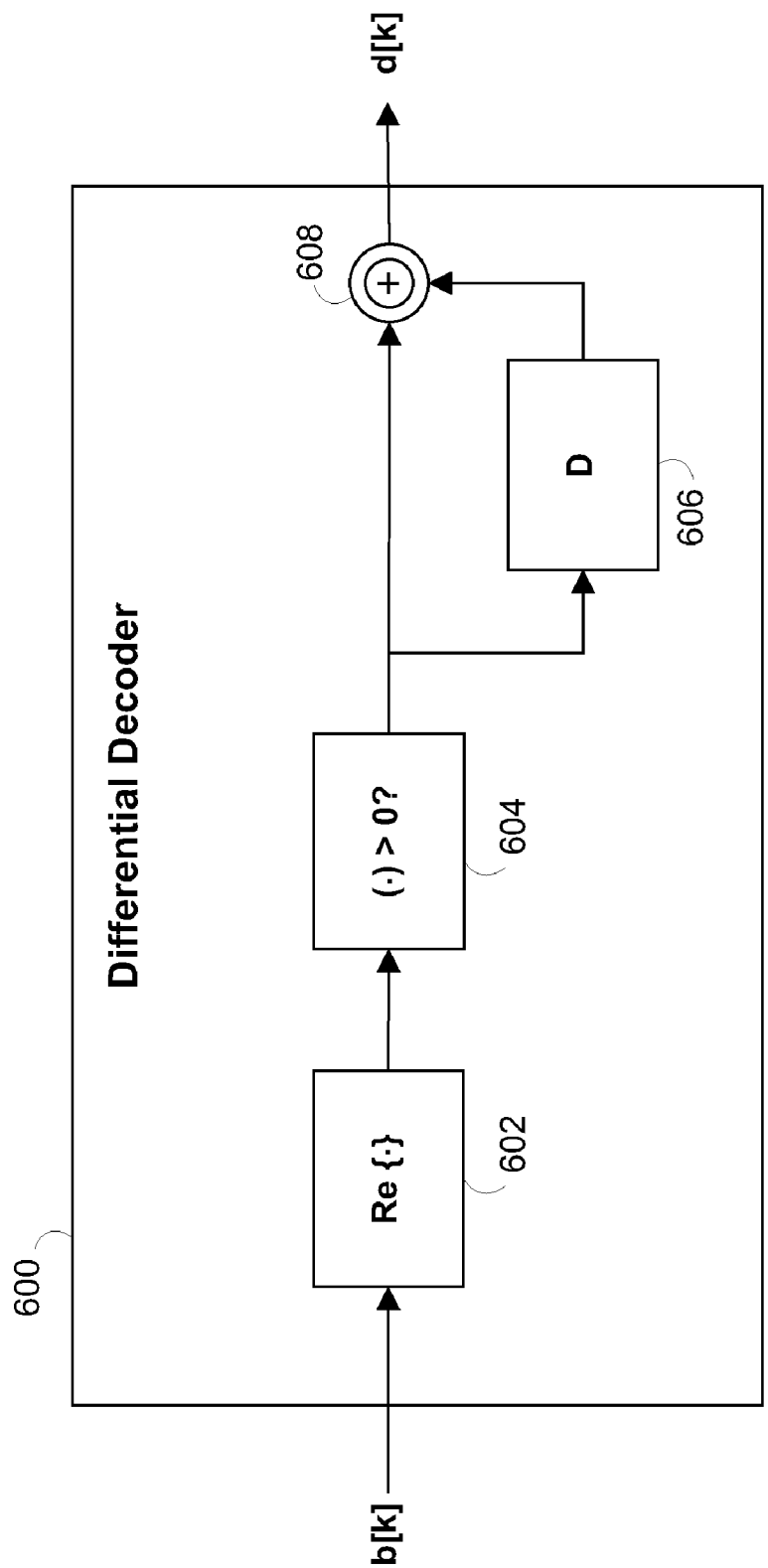
FIG. 6 is a block diagram showing illustrative differential decoder circuitry in accordance with the invention.

FIG. 6 is a block diagram showing illustrative differential decoder circuitry 600 in accordance with the invention. Differential decoder circuitry 600 can be used as differential decoder circuitry 424 or 524 in FIG. 4 or 5, respectively. Differential decoder circuitry 600 can preferably be used to implement a coherent decoding scheme. In coherent decoding, the value of a given symbol can be represented by its phase. For instance, a logical "0" can be represented by a phase of approximately 0 degrees, while a logical "1" can be represented by a phase of approximately 180 degrees. Because accurate phase measurements can be relatively important in coherent decoding, the invention can use a carrier recovery loop in order to ensure a relatively accurate symbol phase.

Differential decoder 600 can include real component detector circuitry 602, comparator circuitry 604, delay circuitry 606, and exclusive-or ("XOR") circuitry 608. Real component detector circuitry 602 can determine the real component of incoming data signal b[k]. It is well known in the art that a symbol can be represented with a real component and an imaginary component. When plotted on a complex plane (where the horizontal axis represents the real component and the vertical axis represents the imaginary component), a symbol with a phase approximately equal to 0 degrees will lie on the right half of the plane and have a positive real component, while a symbol with a phase approximately equal to 180 degrees will lie on the left half of the plane and have a negative real component. Comparator circuitry 604 can compare the detected real component, output from real component detector circuitry 602, to 0. Comparator circuitry 604 can then generate a logical "1" if the real component is greater than 0 and a logical "0" if it is less than 0. Delay circuitry 606 can then delay the output of comparator circuitry 604 by a symbol time, such that XOR circuitry 608 can perform an XOR operation between successive output signals of comparator circuitry 604. If the output signals are logically equal to each other, XOR circuitry 608 can generate a logical "0." Otherwise, if the output signals are logically different from each other, XOR circuitry 609 can generate a logical "1."

Figure 7:
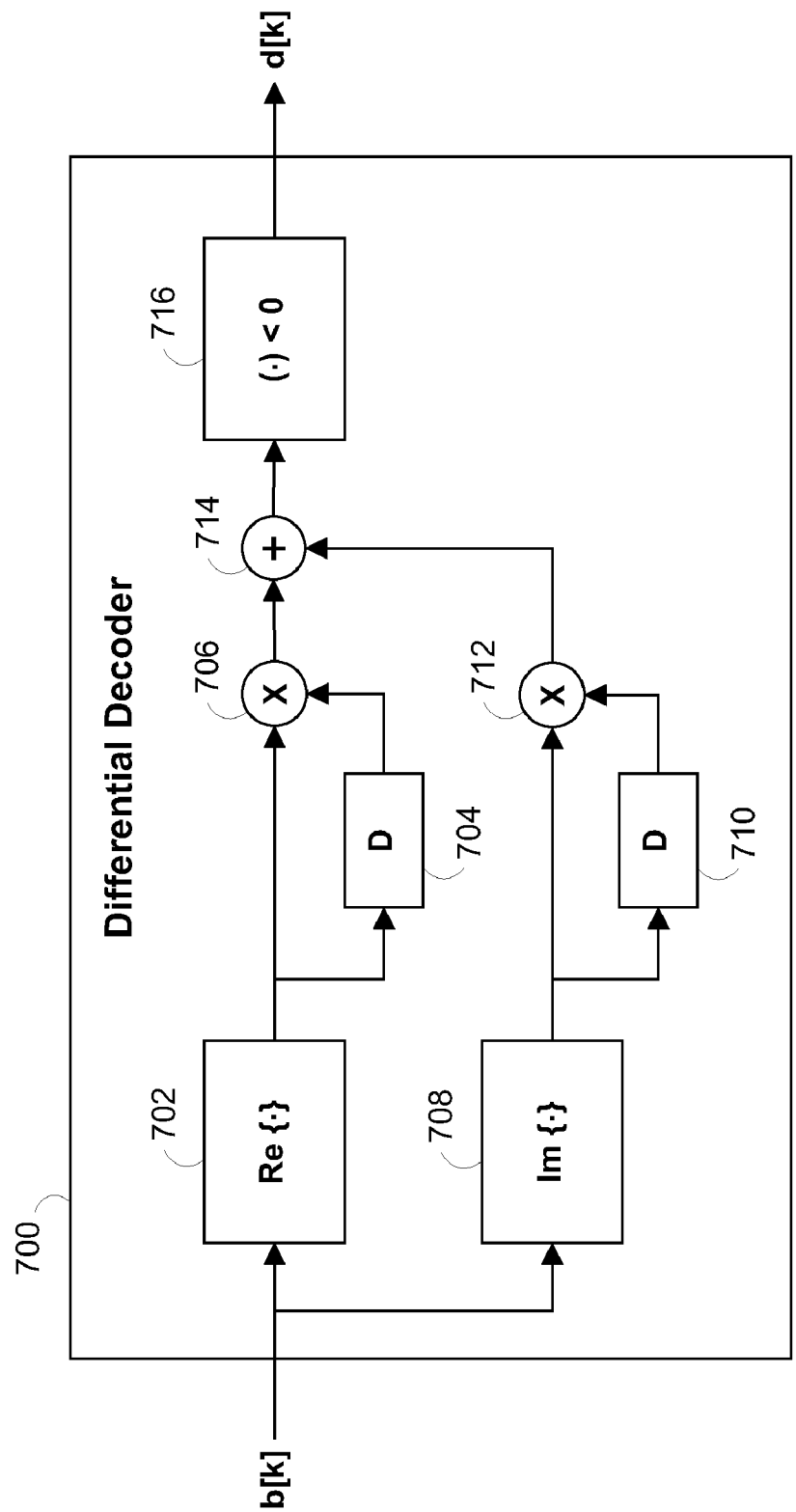
FIG. 7 is a block diagram showing alternative illustrative differential decoder circuitry in accordance with the invention.

FIG. 7 is a block diagram showing alternative illustrative differential decoder circuitry 700 in accordance with the invention. Differential decoder circuitry 700 can be used as differential decoder circuitry 424 or 524 in FIG. 4 or 5, respectively. Differential decoder circuitry 700 can preferably be used to implement a differential decoding scheme. In differential decoding, the value of a given symbol can be represented by the difference between the symbol's phase and the phase of the previous symbol. For instance, a logical "0" can be represented by a phase difference of approximately 0 degrees, while a logical "1" can be represented by a phase difference of approximately 180 degrees. Because only the phase difference between symbols is important in differential decoding (e.g., shifting the phase of two consecutive symbols by the same amount will not affect their phase difference), a carrier recovery loop can be omitted from the RDS receiver circuit in which differential decoder circuitry 700 is used.

Differential decoder circuitry 700 can include real component detector circuitry 702, imaginary component detector circuitry 708, delay circuitries 704 and 710, multiplication circuitries 706 and 712, addition circuitry 714, and comparator circuitry 716. The phase difference between successive symbols can be computed by mathematically multiplying one symbol by the conjugate of the previous symbol, and examining the real component of the product. As shown in FIG. 7, this operation can be implemented relatively efficiently in differential decoder circuitry 700 by separately multiplying successive real components and successive imaginary components, and combining the two products using addition circuitry 714. Comparator circuitry 716 can then compare the output signal of addition circuitry 714 with 0, and generate a logical "0" if that signal is substantially greater than 0 (meaning the phase difference is approximately equal to 0 degrees) and a logical "1" if that signal is substantially less than 0 (meaning the phase difference is approximately equal to 180 degrees).

From the foregoing description, it will be seen that the invention advantageously enables the use of an all-digital RDS receiver circuit. Such a receiver circuit can be used with FM demodulator circuitry generating a digital output signal without performing digital-to-analog conversion. By avoiding this conversion, performance can be enhanced, circuit area can be saved, and design and implementation complexity can be reduced. In addition, the RDS receiver circuits disclosed herein are relatively simple to implement. It will be noted that the use of a digital RDS receiver circuit in accordance with the invention does not preclude the use of FM demodulator circuitry that generates an analog output signal. In such a scenario, the output of the FM demodulator circuitry can be converted to the digital domain by appropriate converter circuitry, using an appropriate sampling rate (e.g., an integer multiple of the RDS symbol rate).

Figure 8:
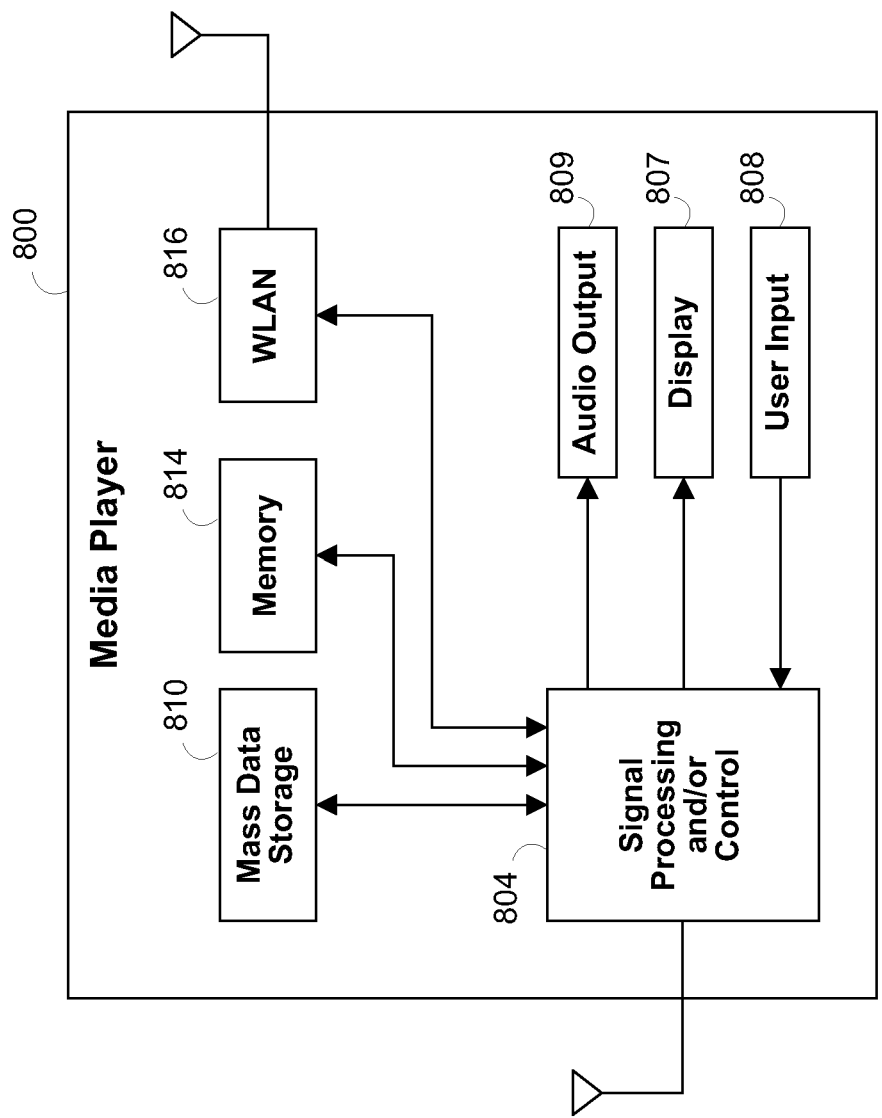
FIG. 8 is a block diagram of an exemplary media player that can employ the disclosed technology.

Referring now to FIG. 8, the present invention can be implemented in a media player 800. The present invention may implement either or both signal processing and/or control circuits, which are generally identified in FIG. 8 at 804, a WLAN interface and/or mass data storage of the media player 800. In some implementations, the media player 800 includes a display 807 and/or a user input 808 such as a keypad, touchpad and the like. In some implementations, the media player 800 may employ a graphical user interface (GUI) that typically employs menus, drop down menus, icons and/or a point-and-click interface via the display 807 and/or user input 808. The media player 800 further includes an audio output 809 such as a speaker and/or audio output jack. The signal processing and/or control circuits 804 and/or other circuits (not shown) of the media player 800 may process data, perform coding and/or encryption, perform calculations, format data and/or perform any other media player function.

The media player 800 may communicate with mass data storage 810 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 800 may be connected to memory 814 such as RAM, ROM, low latency nonvolatile memory such as flash memory and/or other suitable electronic data storage. The media player 800 also may support connections with a WLAN via a WLAN network interface 816. Still other implementations in addition to those described above are contemplated.

Thus it is seen that methods and apparatus are provided for RDS receiver processing in the digital domain. One skilled in the art will appreciate that the invention can be practiced by other than the described embodiments, which are presented for purposes of illustration and not of limitation, and the present invention is limited only by the claims which follow.

What is claimed is:

1. A circuit for receiving a signal, said circuit comprising:
mixer circuitry operable to accept said signal as an input;
filter circuitry in communication with said mixer circuitry;
downsampler circuitry in communication with said filter circuitry, wherein the downsampler circuitry is operable to downsample by a downsampling rate that is varied based on an output of the filter circuitry;
decoder circuitry in communication with said downsampler circuitry, wherein:
an output signal of said decoder circuitry is indicative of radio data system ("RDS") information; and
carrier recovery circuitry in communication with said downsampler circuitry and said decoder circuitry, wherein:
said decoder circuitry is operable to decode an output signal of said carrier recovery circuitry.

2. The circuit of claim 1 wherein said filter circuitry comprises lowpass filter circuitry.

3. The circuit of claim 1 further comprising:
frequency modulation ("FM") demodulator circuitry in communication with said mixer circuitry, wherein:
said FM demodulator circuitry is operable to accept a radio signal as an input and to generate said signal as an output.

4. The circuit of claim 3 further comprising:
matched filter circuitry in communication with said filter circuitry and said downsampler circuitry, wherein:
a first filtering function of said matched filter circuitry is matched to a second filtering function of transmitter circuitry operable to generate said radio signal.

5. The circuit of claim 1 wherein the downsampler circuitry is a first downsampler circuitry, the circuit further comprising second downsampler circuitry in communication with said filter circuitry.

6. The circuit of claim 5 wherein:
said first downsampler circuitry is operable to downsample by a first rate;
said second downsampler circuitry is operable to downsample by a second rate;
a mathematical product of said first and second rates is substantially equal to a modulation rate of transmitter circuitry; and
said transmitter circuitry is operable to transmit a modulated version of said first signal.

7. The circuit of claim 1 wherein said carrier recovery circuitry comprises:
phase detector circuitry;
loop filter circuitry in communication with said phase detector circuitry;
oscillator circuitry in communication with said loop filter circuitry; and
demodulator circuitry in communication with said oscillator circuitry, said downsampler circuitry, and said decoder circuitry.

8. The circuit of claim 1 wherein said downsampler circuitry is in communication with:
   symbol timing acquisition circuitry; and
   symbol timing tracking circuitry, wherein:
   said symbol timing acquisition circuitry and said symbol timing tracking circuitry are further in communication with said filter circuitry.

9. The circuit of claim 8 wherein said symbol timing tracking circuitry comprises:
   phase detector circuitry;
   loop filter circuitry in communication with said phase detector circuitry; and
   oscillator circuitry in communication with said loop filter circuitry, wherein:
   said phase detector circuitry is responsive to a first input signal of said first downsampler circuitry; and
   said oscillator circuitry is responsive to a second input signal of said first downsampler circuitry.

10. A media player comprising the circuit of claim 1.

11. The circuit of claim 1 further comprising symbol timing tracking circuitry that is in communication with the downsampler circuitry and with the filter circuitry, wherein the downsampling rate is based on an output of the symbol timing tracking circuitry.

12. A method of receiving a first signal of a first frequency range in a receiver, said method comprising:
    shifting, in mixer circuitry, a frequency range of said first signal to a second frequency range lower than said first frequency range to generate a second signal;
    extracting content of a signal responsive to said second signal to generate a third signal;
    downsampling a signal responsive to said third signal by a downsampling rate to generate a fourth signal, wherein the downsampling rate is varied based on an output of filter circuitry;
    recovering a carrier signal from a signal responsive to said fourth signal; and
    decoding a signal responsive to said fourth signal to generate an output signal, wherein:
    said output signal is indicative of radio data system ("RDS") information.

13. The method of claim 12 wherein said extracting said content of said signal responsive to said second signal comprises extracting low-frequency content of said signal responsive to said second signal.

14. The method of claim 12 further comprising:
    demodulating a frequency modulation (FM) radio signal to generate a fifth signal, wherein:
    said first signal is responsive to said fifth signal.

15. The method of claim 14 further comprising:
    filtering the signal responsive to said third signal with a first filtering function, wherein:
    said first filtering function is matched to a second filtering function of transmitter circuitry; and
    said transmitter circuitry is operable to transmit said FM radio signal.

16. The method of claim 12 wherein the rate is a first rate, the method further comprising downsampling a frequency range of the signal responsive to said second signal by a second rate to generate a fifth signal.

17. The method of claim 16 wherein:
    a mathematical product of said first and second rates is substantially equal to a modulation rate of transmitter circuitry; and
    said transmitter circuitry is operable to transmit a modulated version of said first signal.

18. The method of claim 12 wherein said recovering comprises:
    detecting a phase of said carrier signal to generate a phase-difference signal;
    filtering said phase-difference signal to generate a control signal;
    generating an oscillating signal whose phase and frequency are determined by said control signal; and
    using said oscillating signal to demodulate said signal responsive to said fourth signal.

19. The method of claim 12 wherein said downsampling comprises:
    acquiring a first symbol timing rate of said signal responsive to said third signal; and
    tracking a second symbol timing rate of said signal responsive to said third signal.

20. The method of claim 19 wherein said tracking comprises:
    detecting a phase of said signal responsive to said third signal to generate a phase-difference signal;
    filtering said phase-difference signal to generate a control signal; and
    generating an oscillating signal whose phase and frequency are determined by said control signal, wherein:
    said downsampling is based on said oscillating signal.

* * * * *